United States Patent [19]

Maggi

[11] Patent Number: 4,900,062

[45] Date of Patent: Feb. 13, 1990

[54] PROCESS FOR PERFUMING BOOKS, DEVICE FOR CARRYING OUT SAID PROCESS, SO-OBTAINED PERFUMED BOOK

[75] Inventor: Dario Maggi, Milan, Italy

[73] Assignee: Ugo Mursia Editore S.p.A., Milan, Italy

[21] Appl. No.: 225,765

[22] Filed: Jul. 29, 1988

[30] Foreign Application Priority Data

Sep. 17, 1987 [IT] Italy .............................. 21945 A/87

[51] Int. Cl.[4] ........................ B42D 5/00; B42D 15/00; B32B 25/00; B42C 11/00

[52] U.S. Cl. .................................. 281/15.1; 283/63.1; 412/5; 428/402.21

[58] Field of Search .................... 412/3, 4, 5, 6, 8, 19, 412/20, 21; 281/15 R, 1, 3; 428/402.21; 282/1, 2, 8, 22; 283/63; 223/86; 523/102; 512/2, 4, 5

[56] References Cited

U.S. PATENT DOCUMENTS 3,466,682 9/1969 French .................................. 412/19
4,299,410 11/1981 Jukola .................................. 412/19
4,556,353 12/1985 Ehlermann ............................ 412/19
4,610,927 9/1986 Igarashi et al. ................ 428/402.21
4,725,575 2/1988 Frihart et al. ........................ 523/102

FOREIGN PATENT DOCUMENTS 2085463 4/1982 United Kingdom ................ 523/102
2093856 9/1982 United Kingdom ................ 523/102

*Primary Examiner*—Douglas D. Watts
*Assistant Examiner*—Paul M. Heyrana, Sr
*Attorney, Agent, or Firm*—Neuman, Williams Anderson & Olson

[57] ABSTRACT

The process for perfuming books comprising applying at least one perfumed essence in a liquid state on at least one outer surface of the flyleaves of the book, adjacent to the back of the volume block of the book, and/or adding at least one perfumed essence to the glue used to secure the cover of the book to the external surface of the flyleaves. The external application of the perfumed essence to the external surface of the flyleaves is carried out by means of trapezoid shaped rollers revolving into contact with the volume block adjacent to the back, by means of a first end thereof, and where the second end of the rollers, diametrically opposite to the first one, is simultaneously dipped int he perfumed essence contained in a tray.

8 Claims, 2 Drawing Sheets

PROCESS FOR PERFUMING BOOKS, DEVICE FOR CARRYING OUT SAID PROCESS, SO-OBTAINED PERFUMED BOOK

The present invention relates to a process for perfuming books, to a device for carrying out such a process, and to a perfumed book so obtained.

Perfuming books, letters and the like, in order to make the reading thereof, or even only consulting them, particularly pleasant, is already known.

The presently used process consists in simply generally sprinkling, or spraying, the sheets which constitute the books with sweet-scented essences.

Even if it reaches the intended purpose, such a process is laborious, difficult to mechanize, and does not secure the persistence of the fragrance over time, unless a large amount of essence is used.

The use of a large amount of essence, to which resort is had in order to obviate the exhaustion of the fragrance over time, on the other hand, causes an increase in costs, above all in case essences having a special perfume are used.

Furthermore, in such cases, the initial intensity of the perfume may result annoying, to the extent of reaching on the reader the contrary effect to as desired.

Other drawbacks can finally derive from the possible staining, or colour turning, of the pages of the book over time, due to the direct contact with the essence.

The purpose of the present invention consists in providing a process for perfuming books, which is capable of obviating the above drawbacks, and which is hence easy to perform, easy to mechanize, and which makes it possible a persistently perfumed book to be obtained, with a perfume intensity which is moderately constant over time, and is such as to anyway prevent the pages from discolouring or getting stained because of the essences, even many years after the printing of the book.

Such a purpose is reached by a process for perfuming books, which comprises:

a first step of printing of at least one sheet, a second step of folding of said at least one sheet, in order to form a signature;

a third step of union of a plurality of signatures in an ordered arrangement;

a fourth step of glueing of a back in order to obtain a volume block;

a sixth step of glueing of a cover to the flyleaves of said volume block in order to obtain a book, characterized in that between said fourth step and said sixth step a fifth step of application of at least one type of perfumed essence to at least one outer surface of the flyleaf of the volume block is provided.

The advantages achieved by means of the present invention essentially consist in that the above seen technical drawbacks are solved, in such a way as to allow a much more rewarding reading, above all in case of books wherein atmospheres and smells of far Countries are often recalled, which the reader's phantasy alone would not be able to appreciate to a complete extent.

The proces is illustrated for merely exemplifying and non-limitative purposes in the figures of the hereto attached drawing tables, wherein.

Figure 1:
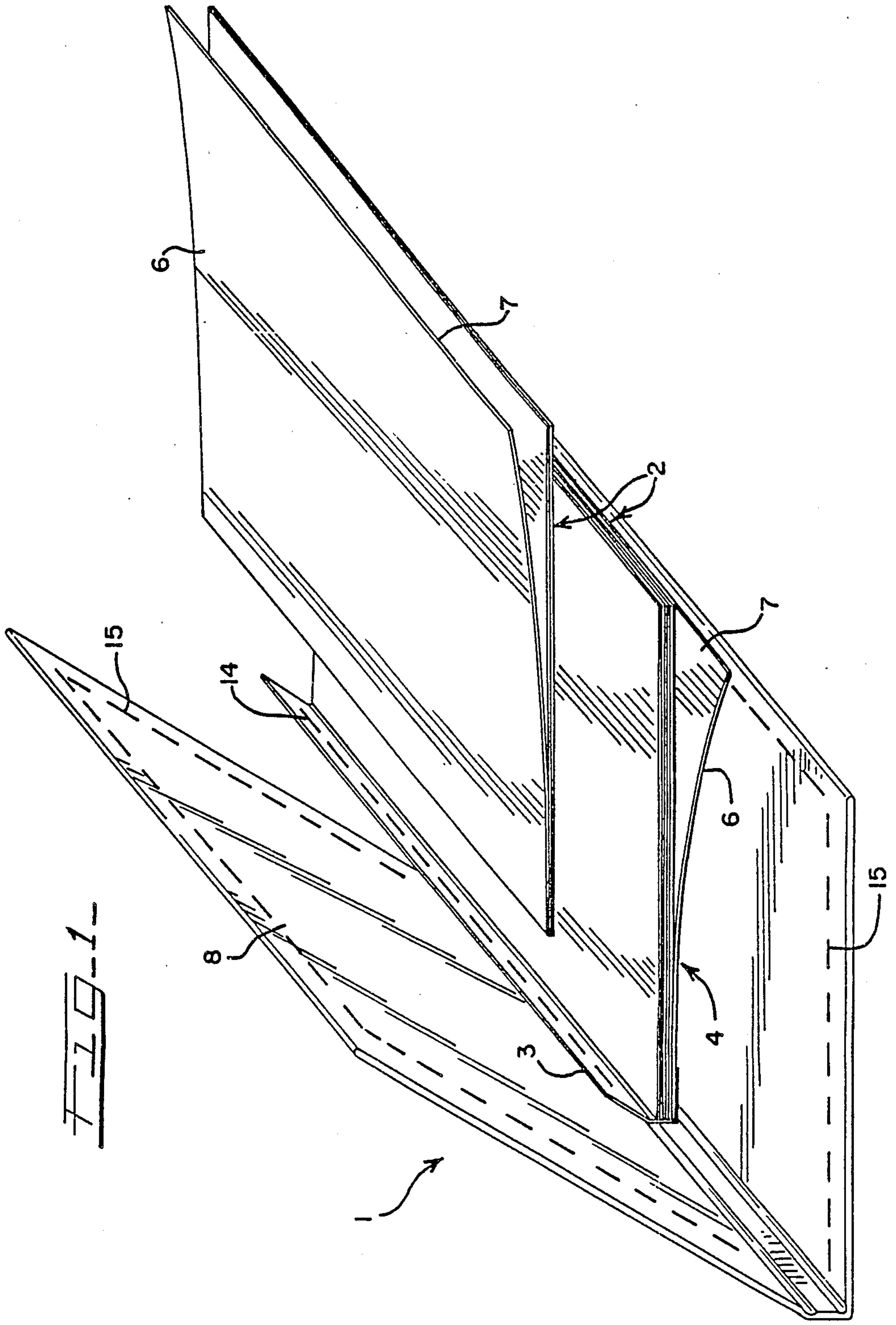
FIG. 1 shows an exploded view of a book.

Referring to the above cited figures, the process according to the present invention is carried out by integrating with some steps the traditional process for obtaining a book.

During the first step, the printing on both the pages of one or more sheet(s) is carried out, wherein each of said sheets is typographically subdivided into sectors which will constitute the future pages of the book 1.

During the second step, the folding is carried out, so as to obtain a signature 2, which is orderly united with the other signatures (the third step), e.g., by stitching with a thread.

The block of the so-united signatures is then sent to the application, by glueing 14, of a back 3 (the fourth step), so as to obtain a volume block 4. The volume block 4, through transport means constituted by a conveyor belt 5 comes to a machine (not shown in the figures) which applies to it, by glueing 15 on the relevant outer surfaces 6 of the flyleaves 7, the cover 8 (the sixth step), with the book 1 being obtained.

Figure 2:
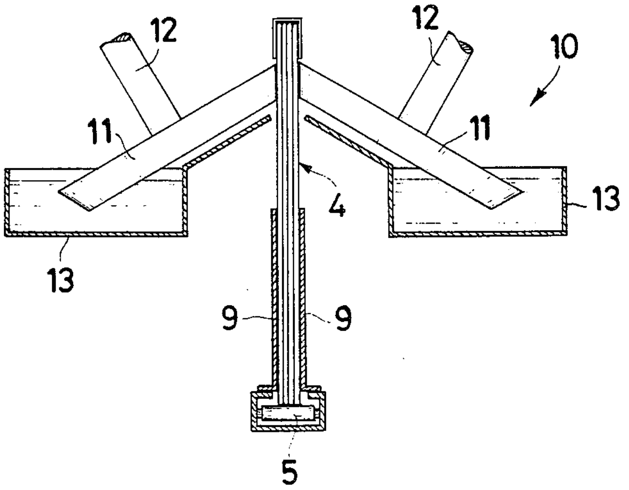
FIG. 2 shows the device for applying the perfumed essence.

The conveyor belt 5 (see FIG. 2), which comprises a couple of guides 9 which keep the volume block 4 in the vertical position with the back 3 being directed upwards, constitutes an integrating part of a device for the application of the perfumed essence, generally indicated by the reference numeral 10, comprising, among others, a couple of rolls 11 having a cross-section of trapezoidal shape, positioned on both sides of the guides 9 on convergent shafts 12 in such a way that an end of the same rolls engages the volume block 4, whilst each one of the opposite ends dips in a tray 13 filled with perfumed essence.

The conveyor belt 5 and the device 10 constitute, together with each other, means for applying said essence.

The volume block 4 passing on the conveyor belt 5 between the guides 9 is lapped on both sides, in the nearby of the back 3, by the side surface of each roll, which transfers the essence in an amount proportional to the widths of said surfaces, and to the degree of dilution of the essence in the trays 13 (the fifth step).

The rolls 11 can indifferently be either idle, or motodriven. After travelling beyond the device 10 for the application of the perfumed essence, the volume block 4 continues its way in order to reach the already-disclosed sixth step. The end perfuming effect can be furthermore improved by also adding the perfumed essence to the necessary glue for uniting the back 3 to the flyleaves 7, and to the glue used for binding the cover 8 to the volume block 4, which, during the sixth step, is spread on the flyleaves 7 of the same volume block.

In any cases, anyway, the perfumed essence is interposed between the outer surfaces 6 of the flyleaves 7 and the cover 8, possibly blended with the glue used in order to bind such surfaces and to the glue used in order to also bind the back 3 to the signatures 2.

Such a structure makes it hence possible the scent to be gradually and continuously released over time, with said scent permeating all the pages of the book, but without causing the drawbacks to occur, which affect the present state of the art.

I claim:

1. Process for perfuming books comprising:

printing at least one sheet of paper;

folding said sheet of paper in order to form a signature;

securing a pluarlity of said signatures in an ordered arrangement, said external front and back portions of said signature each being covered with a flyleaf;

glueing a back on to one side of said signature whereby said signature and said flyleaf form a volume block;

applying at least one type of perfumed essence to at least one external surface of said flyleaf of said volume block; and glueing a cover to said external surfaces of said flyleaves of said volume block in order to obtain a book.

2. Process according to claim 1, wherein said perfumed essence is applied adjacent to said back.

3. Process according to claim 1, wherein the glueing steps are carried out by using glue to which at least one type of perfumed essence is added.

4. Device for carrying out the process according to claim 1, comprising means for the application of at least one type of perfumed essence on at least one of the external surfaces of said flyleaf of said volume block.

5. Device according to claim 4, wherein said means for the application of said essence comprise at least one revolving roller inclined relatively to the vertical in such a way that in a circumferential point said revolving roller dips inside a tray containing at least one type of said perfumed essence, and in a diametrically opposite point said roller revolves into contact with said volume block adjacent to the back of said volume block, with said volume block translating between guides of a conveyor belt.

6. Device according to claim 5, wherein said roller has a cross-section of trapezoidal shape.

7. Device according to claim 5, wherein said device is located in a series between a machine which unites a plurality of signatures, and a machine for the application of the cover.

8. Perfumed book obtained according to the process according to claim 1.

* * * * *